(12) United States Patent
Bender et al.

(10) Patent No.: US 11,487,866 B2
(45) Date of Patent: Nov. 1, 2022

(54) REMOTE PERMISSIONS MONITORING AND CONTROL

(71) Applicant: International Business Machines Corporation, Armonk, NY (US)

(72) Inventors: Michael Bender, Rye Brook, NY (US); Rhonda L. Childress, Austin, TX (US); David B. Kumhyr, Austin, TX (US); Michael John Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/655,181

(22) Filed: Oct. 16, 2019

(65) Prior Publication Data

US 2020/0050752 A1    Feb. 13, 2020

Related U.S. Application Data

(63) Continuation of application No. 15/201,546, filed on Jul. 4, 2016, now abandoned.

(51) Int. Cl.
| | |
|---|---|
| *G06F 21/00* | (2013.01) |
| *G06F 21/51* | (2013.01) |
| *G06F 21/62* | (2013.01) |
| *G06F 8/60* | (2018.01) |

(52) U.S. Cl.
CPC ............ *G06F 21/51* (2013.01); *G06F 8/60* (2013.01); *G06F 21/629* (2013.01); *G06F 2221/033* (2013.01)

(58) Field of Classification Search
CPC ........ G06F 21/51; G06F 21/629; G06F 9/542; G06F 2221/033; G06F 8/60; G06F 21/50; G06F 21/57; G06F 21/60; H04L 29/06877; H04L 29/06884
See application file for complete search history.

(56) References Cited

U.S. PATENT DOCUMENTS

| | | | |
|---|---|---|---|
| 7,739,682 B1 | 6/2010 | Badenell | |
| 2007/0204039 A1 | 8/2007 | Inamdar | |
| 2008/0120611 A1 | 5/2008 | Aaron | |
| 2013/0040629 A1* | 2/2013 | Sprigg | H04N 21/25841 455/419 |

(Continued)

OTHER PUBLICATIONS

List of IBM Patents or Patent Applications Treated as Related, Nov. 19, 2019.

(Continued)

*Primary Examiner* — Jeffrey C Pwu
*Assistant Examiner* — Helai Salehi

(57) ABSTRACT

A security application may monitor applications attempting to be installed on a user device. In one example, various steps may include at least one of: receiving an application access operation on a computing device, identifying at least one application action associated with the application access operation, retrieving an application security profile stored in memory, identifying at least one application security restriction in the application security profile related to the at least one application action, restricting the at least one application action from occurring based on the at least one application security restriction and notifying a pre-registered device responsive to restricting the at least one application action.

21 Claims, 4 Drawing Sheets

(56) References Cited

U.S. PATENT DOCUMENTS

| | | | |
|---|---|---|---|
| 2013/0054803 A1* | 2/2013 | Shepard | H04L 63/0884 709/225 |
| 2013/0132565 A1 | 5/2013 | Cetin et al. | |
| 2013/0143512 A1* | 6/2013 | Hernandez | H04W 4/00 455/404.1 |
| 2013/0260721 A1* | 10/2013 | Carney | H04M 1/72463 455/411 |
| 2013/0305379 A1* | 11/2013 | Udani | G06F 21/51 726/26 |
| 2015/0040246 A1 | 2/2015 | Yuen et al. | |

OTHER PUBLICATIONS

Michael Bender et al., "Remote Permissions Monitoring and Control", U.S. Appl. No. 15/201,546, filed Jul. 4, 2016.

* cited by examiner

REMOTE PERMISSIONS MONITORING AND CONTROL

TECHNICAL FIELD

This application relates to application blocking and more particularly to retrieving a security profile that is used to determine whether to permit an application install on a computing device or notify a third party regarding a status related to the application.

BACKGROUND

Applications with requirements can overwhelm a user of a computing device. For example, downloading an application may trigger a request for multiple permissions to be accepted. A user may not be aware of the ramifications of permitting such an action to occur during an installation procedure.

During an application access operation or install procedure, the application may seek access to various controls, permissions and other features of a user's device and profile causing security and privacy issues. The various requests instantiated during an application may not be handled properly due to the amount of information or number of requests presented by the application.

SUMMARY

One example embodiment may include a method that includes at least one of receiving an application access operation on a computing device, identifying at least one application action associated with the application access operation, retrieving an application security profile stored in memory, identifying at least one application security restriction in the application security profile related to the at least one application action, restricting the at least one application action from occurring based on the at least one application security restriction and notifying a pre-registered device responsive to restricting the at least one application action.

Another example embodiment may include an apparatus that includes a receiver configured to receive an application access operation and a processor configured to perform at least one of identify at least one application action associated with the application access operation, retrieve an application security profile stored in memory, identify at least one application security restriction in the application security profile related to the at least one application action, restrict the at least one application action from occurring based on the at least one application security restriction, and notify a pre-registered device responsive to restricting the at least one application action.

Yet another example embodiment may include a non-transitory computer readable storage medium configured to store instructions that when executed causes a processor to perform at least one of receiving an application access operation on a computing device, identifying at least one application action associated with the application access operation, retrieving an application security profile stored in memory, identifying at least one application security restriction in the application security profile related to the at least one application action, restricting the at least one application action from occurring based on the at least one application security restriction, and notifying a pre-registered device responsive to restricting the at least one application action.

DETAILED DESCRIPTION

Figure 1:
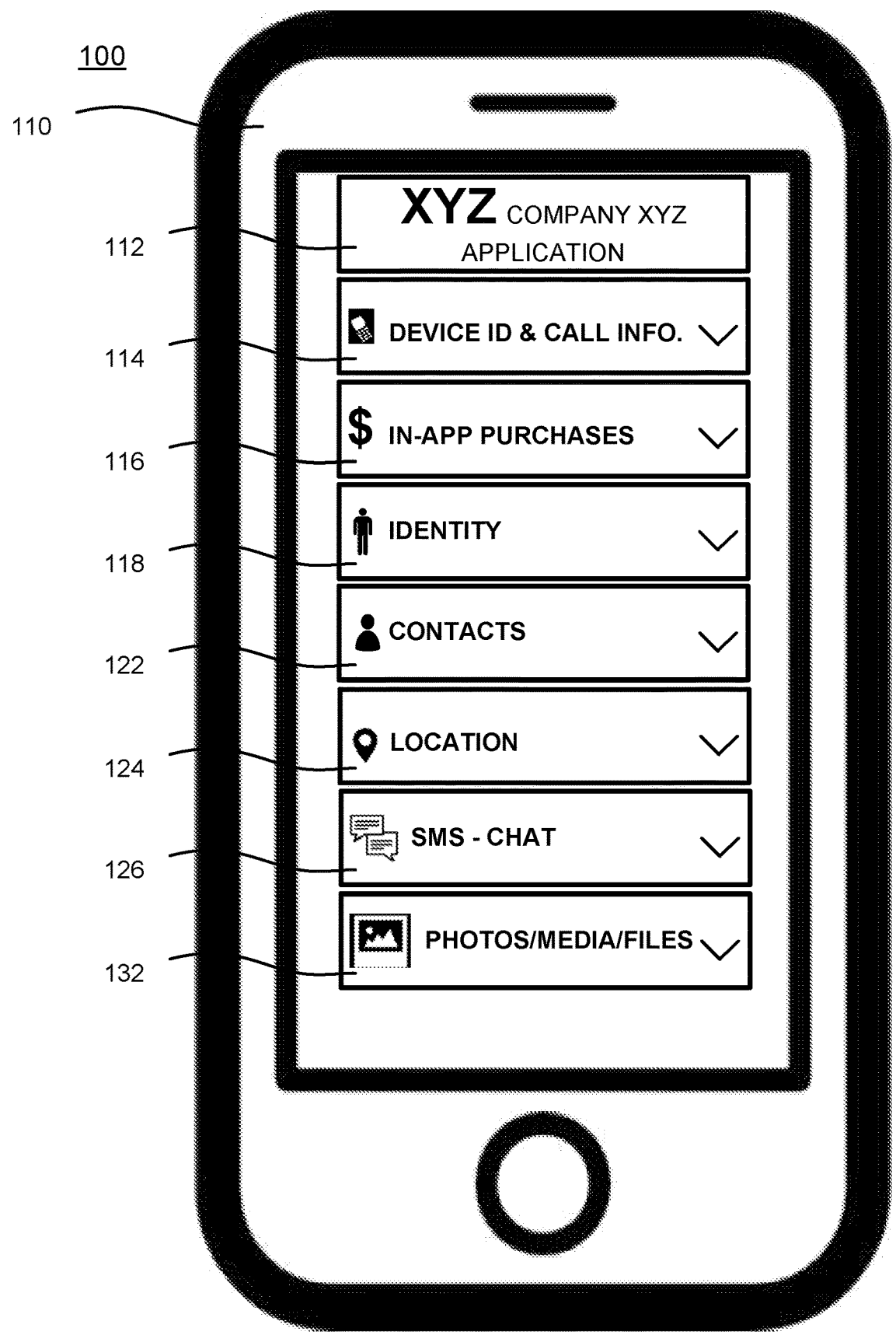
FIG. 1 illustrates an example user interface of a user device receiving a set of permission requests of an application attempting to be installed according to an example embodiment.

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which identifies potential risks and determines whether to block, pause, and/or request third party approval for a particular application install on a particular device. One example procedure may include an extension to a computer program on a mobile device that manages the installation of applications, the extensions may utilize a central profile linked to the mobile device, and the extended function cross-references a profile against access requested by the to-be-installed application. The profile may be stored on a remote server, the device or a third party device linked to the device based on the permissions setup by the third party, such as a parent, guardian or security service which is setup to protect the device from malicious or unwanted application access.

The application installation can be delayed (paused) or prevented altogether until approved by the designated third party as defined in the setup user profile for that device. The security application of the example embodiments may be a relatively small sized application (i.e., memory requirements) and may be installed to operate in the background processes with no visible interface or indicators. In general, the application will not be readily removable or may be password protected to prevent installation by a child or subject who is being monitored by a third party for safety and concern purposes. Anytime an application installation, modification and/or update operation is attempting to be performed on a monitored device, the application may retrieve the specific profile settings to ensure the application is not attempting to access information specifically being monitored by the user profile settings. For example, the user profile may prohibit photos and other media, location services and personal information from being shared with any application access operations unless specific permission has been authorized by a third party device. However, the various other settings and permissions requested by an application during an installation may be permissible and would not invoke a notification being created and sent to the designated third party.

FIG. 1 illustrates an example user interface of a user device receiving a set of permission requests of an application attempting to be installed according to an example embodiment. Referring to FIG. 1, the user interface 100 includes a user device 110 with its display populated with a variety of permissions requested by an application install procedure by an application accessed from an online data source, such as an application or app store, a web site, etc. The user device 110 may be a cellular phone, a smart phone, a tablet, a laptop, a wearable device (such as a watch or glasses), and or any device including a processor and memory. A user profile may be setup, customized with the third party preferences for notification and blocking of installation of applications, based on one or more permissions which are not considered permissible without explicit permission from the third party. The user profile can be by a universally unique identifier (UUID), which stays with the phone, an international mobile subscriber identity (IMSI) or international mobile station equipment identity (IMEI), which will not permit the phone to be easily hacked or spoofed. In general, an applet or security package/module/software may be installed on the device/phone 110 in question, which will provide an intercept function anytime certain permissions or requests are identified.

In the example of FIG. 1, the XYZ company may have an accessible application 'XYZ application' 112 that is downloadable and accessible by a device and an Internet Protocol/Internet or other connection. The act of selecting the application and selecting to install the application initiates a menu, such as the example menu illustrated in FIG. 1. The menu may have one or more of the example permissions requested including access to a device identifier or call information 114, in-application purchases 116, user identity 118, the user's contacts which may include personal phone contacts, email contacts, social network contacts, etc. 122, the user's past, present and/or future locations (based, for example, on calendar entries) 124, information from text or chat sessions 126 and/or the user's photos/media 132.

The customized user profile stored in memory (described herein) may have one or more of the permissions flagged as requiring approval from the third party who setup the profile including the action(s) to be performed. For example, an action sequence may be performed to include one or more of: 1) block installation(s), 2) create and send notification(s) with application name(s), permission(s) currently flagged, 3) approval request option (i.e., button to respond and approve or deny), etc. The action sequence can be customized to display the flagged information and any information the third party user may require prior to overriding the security measure and permitting the monitored user to complete the installation.

Figure 2:
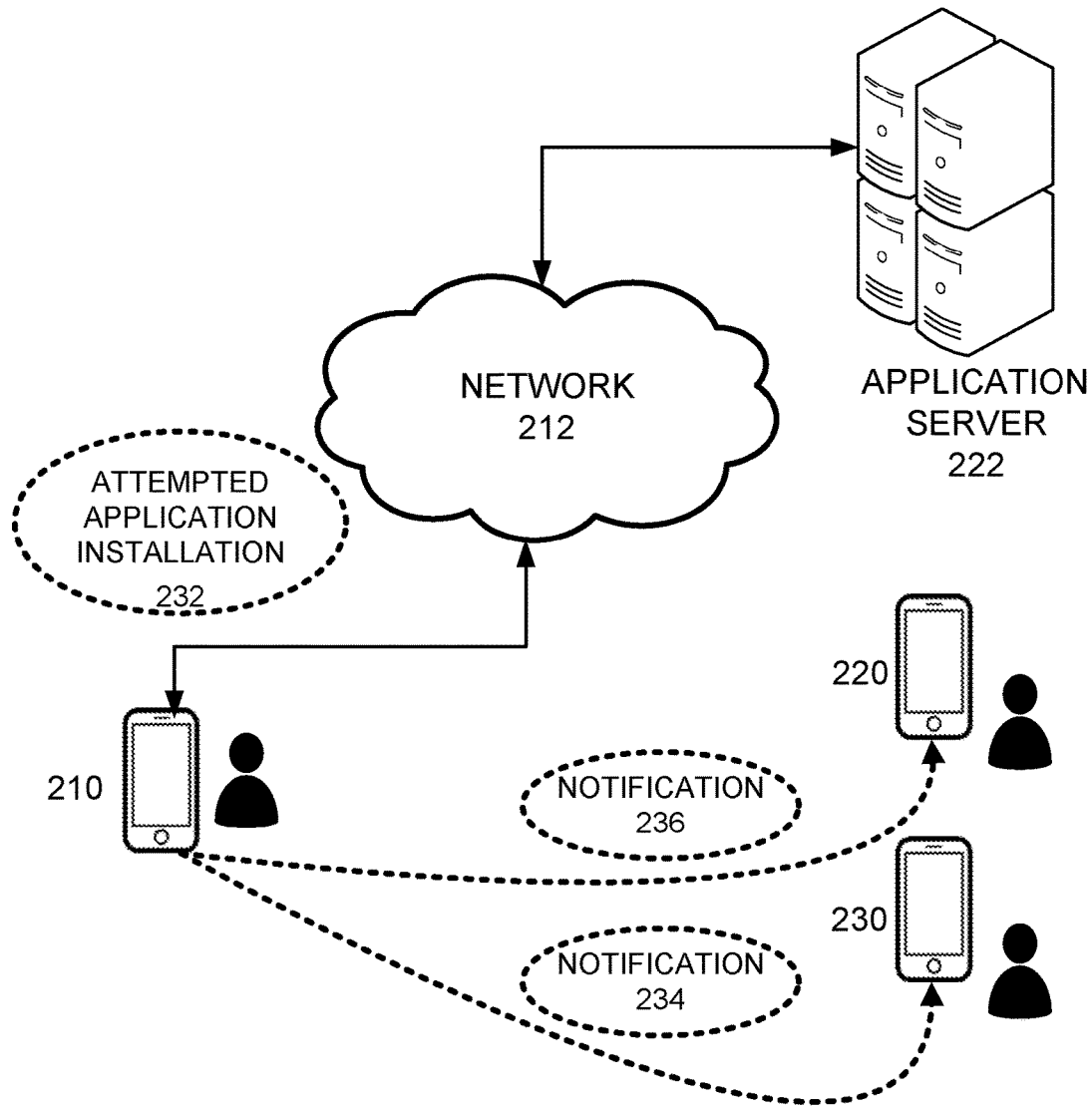
FIG. 2 illustrates an example network of a user device receiving a request for permissions from an application install procedure and notifying other interested parties according to an example embodiment.

FIG. 2 illustrates an example network 200 of a user device 210 receiving a request for permissions from an application install procedure and notifying other interested parties according to an example embodiment. Referring to FIG. 2, the network 200 includes a network 212, such as the Internet or other data network which, via various components (not shown), connects the application source 222 to the user device 210 attempting to access and download the application. The other devices 220 and 230 may represent, be registered to or used by guardians, such as parents, teachers, caretakers, or other individuals who are registered in the security applet or security package/module/software and user profile to receive updates and notifications pertaining to the user actions. The other devices 220 and 230 may be a cellular phone, a smart phone, a tablet, a laptop, a wearable device (such as a watch or glasses), and or any device including a processor and memory.

In operation, the user phone 210 contacts the application store 222 across the network 212 and another installation mechanism may attempt to load the application pre-installation menu which identifies the amount of memory the application will require and/or the permissions/requirements requested or needed in order to enable the installation 232. The install applet or package/module/software currently operating on the phone may inspect all the information the application is seeking to access and then retrieve the user profile for that device 210 from an internal memory, a remote server and/or the third party device 220 and/or 230. The information about the access operation (i.e., list of permissions) is matched against the information in the profile. If the access is a positive match, for example, access to a module and/or a function (such as a camera) is part of the application permissions requested and if that is one of the audited items in the profile list, then the action(s) to be performed are retrieved as well. These action can include examples such as 'gain permission from a secondary party' or 'pop up to warn before installing' or 'deny the installation of the app after presenting a pop up on why the app is being denied', etc. If any of the actions require permission from the third party, the interested parties 220 and/or 230 identified in the profile by name, number, status (i.e., parent, guardian), are then notified. The notifications 234 and/or 236 are sent accordingly to notify and request permission to proceed. The third parties may have certain statuses, such as senior or junior where one party can grant permission at a junior status but the senior party can override that decision within a predetermined period of time, for example. Otherwise the junior party's permission may be enacted and the application may be installed thereafter without requiring communication from the senior party.

In the event that there is no match between requested permissions and monitored permissions within the user profile, then the information is sent back to permit the install to proceed, and the application is installed accordingly. If there is a match on the access function but the action is to warn, then the information is sent back to the device and a menu may be provided to require explicit permission. In this case, the user takes an overt action to allow or enact the install via one or more of: by speaking into their device, selecting a menu option or any other known affirmation procedure, and the access and installation can then proceed.

In the event that there is a match and the action is a secondary approval then a notification or message (such as an SMS) can be sent to the secondary phone(s) and the user either approves the install or does not approve the install. The information is then sent back to the original application install phone 210. The phone application (or an off-board process communicably coupled to the phone) inspects what is received from the message contents. If the secondary control says to not install, an alert is received (optionally) and no install is permitted. If an install is permitted, then the application is installed. This can also be set up by having the user profile resident on the phone and locked so the application and profile cannot be removed. When enabled on the device, the modified 'store' applet or package/module/software would scan for access to certain functions (e.g., camera usage, access to address book, access to photos, etc.). If unauthorized functionality was requested, approval would be needed by a registered third party. The application could use the same process to warn an adult about giving out access too quickly for applications that they are installing on their own device as security is an issue for anyone, not just children.

One example embodiment may include a system and method for a mobile device to manage the installation of applications based upon access to functions on the mobile device. This example includes a central profile that is linked to the mobile device and which cross-references the user profile against requested to-be-installed application and its requested permissions. The install may be suspended, blocked or delayed until approved by a third party. The factors to be considered in the profile include the resources that an application may request access to being managed by the approver. The installation completes upon approval via an SMS message from the approver or is rejected depending on the contents of the message received back at the device.

Figure 3:
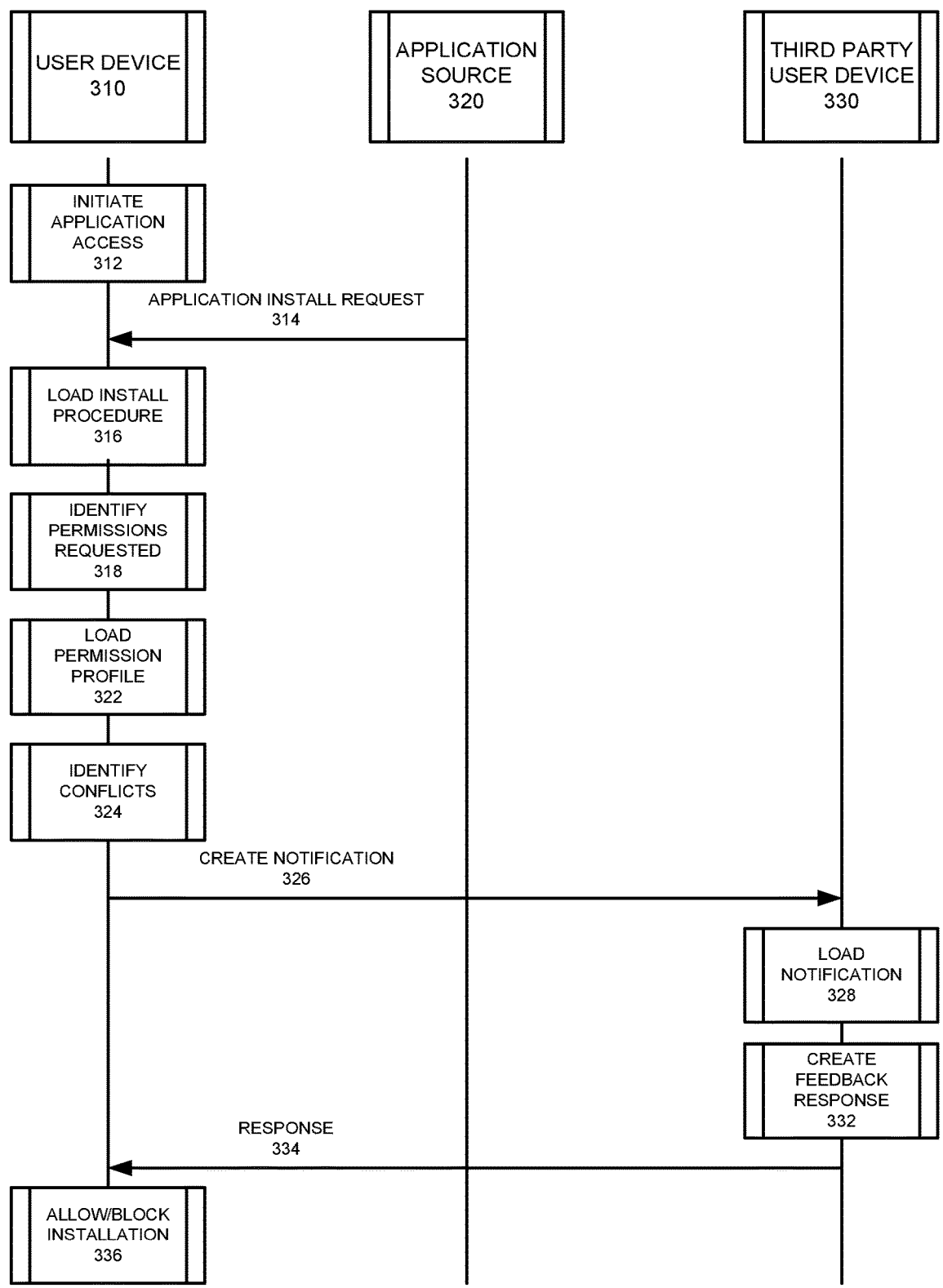
FIG. 3 illustrates a system signaling diagram of various processes and communication operations during an attempted application install procedure according to an example embodiment.

FIG. 3 illustrates a system diagram 300 of various processes and communication operations during an attempted application install procedure according to an example embodiment. Referring to FIG. 3, the system diagram 300 includes a user device 310 and an application data source 320 which are communicably coupled to one another, and which is monitored by a user device 330 based on security application settings. The application source 320 represents the application store or company data source which provides access to the applications identified by the user device 330. In operation, the user device 310 may initiate an application access and/or install operation 312. The application source 320 is notified and the application install request is sent 314 to the user device 310. The user device may load the install initiation page 316 which presents the permissions and requests sought by the application source 320 in order to download the application. The specific permissions are identified 318 and separated in, for example, a tabular form and may be listed, parsed and/or separated as parameters requiring a comparison operation by the permissions in the user profile 322 which may be stored locally or on another device. Any matches between restrictions in the user profile and the permissions sought by the application are noted 324 and used as the basis to create a notification 326 which is sent to the third party user device(s) 330 identified in the user profile. The third party device may then load the notification and prompt the user via a user interface to allow or prevent the install. A feedback message 332 is created and sent 334 to the user device 310 so the install can be allowed/blocked 336.

In another example embodiment, a method may include at least one of receiving an application access operation on a computing device, identifying at least one application action associated with the application access operation, retrieving an application security profile stored in memory, identifying at least one application security restriction in the application security profile related to the at least one application action, restricting the at least one application action from occurring based on the at least one application security restriction and notifying a pre-registered device responsive to restricting the at least one application action. The receiving the application access operation on the computing device can include receiving an install request message, and each of the application actions are associated with a separate permission response.

The method can further comprise: notifying the pre-registered device by creating a notification based on the at least one application action and transmitting the notification to the pre-registered device, and permitting (optionally automatically) the at least one application action to be performed, and the at least one application action includes at least one of: a download, an install, access to location information, access to contacts, access to an e-mail account, access to an instant message account, access to a social network profile, access to photographs, access to multimedia, and access to documents. The restricting the at least one application action from occurring can prevent an installation of the application from occurring on the computing device.

The embodiments herein may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example network element 400, which may represent or be integrated in any of the above-described components, etc.

Figure 4:
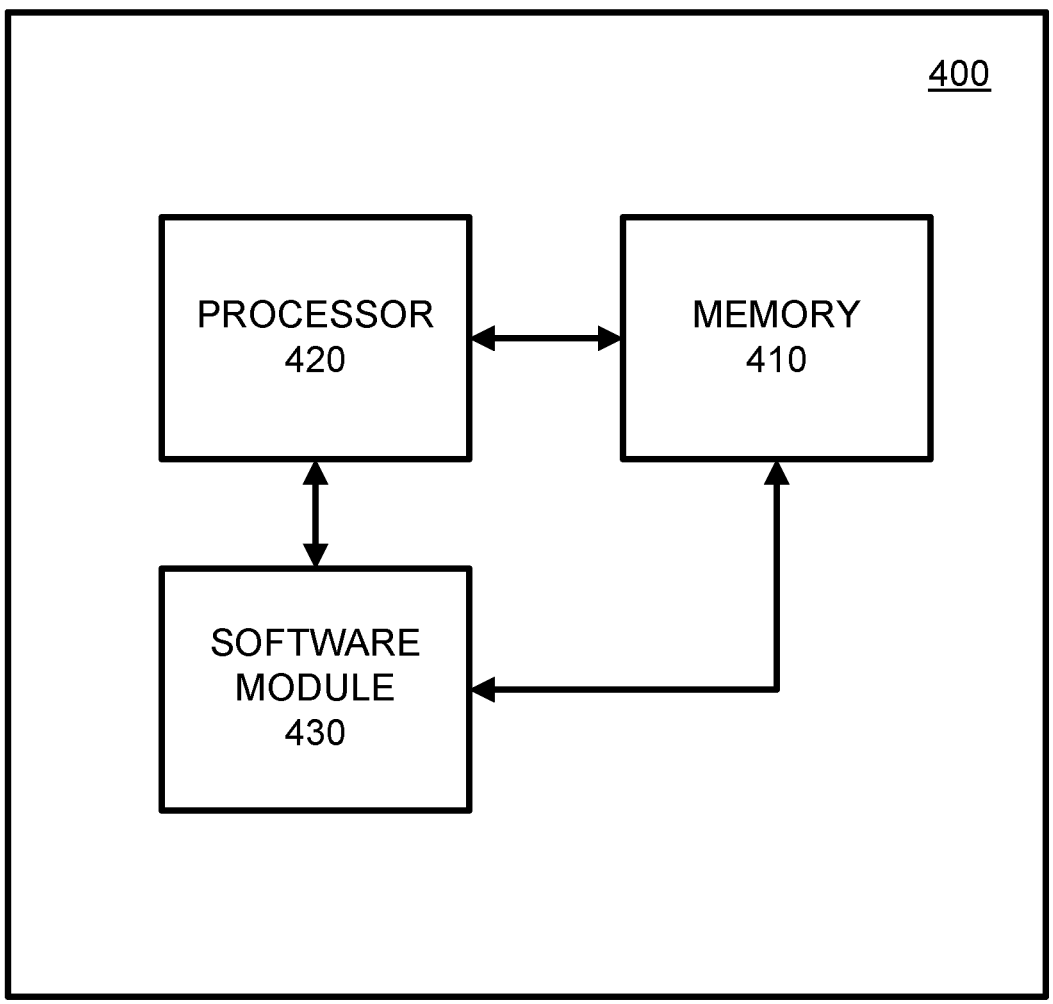
FIG. 4 illustrates a non-transitory computer readable medium and computer processing platform for performing procedures according to an example embodiment.

As illustrated in FIG. 4, a memory 410 and a processor 420 may be discrete components of a network entity 400 that are used to execute an application or set of operations as described herein. The application may be coded in software in a computer language understood by the processor 420, and stored in a computer readable medium, such as, a memory 410. The computer readable medium may be a non-transitory computer readable medium that includes tangible hardware components, such as memory, that can store software. Furthermore, a software module 430 may be another discrete entity that is part of the network entity 400, and which contains software instructions that may be executed by the processor 420 to effectuate one or more of the functions described herein. In addition to the above noted components of the network entity 400, the network entity 400 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   initiating an install procedure of an application on a computing device;
   detecting application permissions requested by the application from the computing device during the install procedure;
   determining a flag has been set on an application permission from among the detected application permissions based on an application security profile;
   temporarily blocking the install procedure of the application from continuing on the computing device based on the flagged application permission;
   identifying, by a security module installed on the computing device where the application is temporarily blocked, a phone number of a remote user device stored within a security profile of the computing device; and
   transmitting, via a network, a request to the remote user device based on the identified phone number, the request comprising an identification of the flagged application permission and a request for a user input via the remote user device to resume the temporarily blocked install procedure;
   receiving, by the security module installed on the computing device where the application is temporarily blocked, a response from the remote user device indicating whether or not to allow the application to access to the flagged application permission.

2. The method of claim 1, comprising receiving an application access operation on the computing device which comprises receiving an install request message.

3. The method of claim 1, wherein the flagged application permission comprises one or more of permission for in-app purchases and permission to access a contacts list stored on the computing system.

4. The method of claim 1, wherein the transmitting the request comprises transmitting a prompt to a user interface of the remote user device which requests a user input from a guardian.

5. The method of claim 1, wherein the flagged application permission comprises one or more of access to location information, access to contacts, access to an e-mail account, access to an instant message account, access to a social network profile, access to photographs, access to multi-media, and access to documents.

6. The method of claim 1, wherein the method further comprises displaying a list of the detected application permissions requested during the install procedure via a user interface of the computing device.

7. The method of claim 1, wherein the detecting comprises intercepting the application permissions requested by the application via a security module that is installed locally on the computing device.

8. The method of claim 4, wherein the input from the guardian overrides the temporarily blocked install procedure on the computing device.

9. An apparatus, comprising:
a processor configured to:
initiate an install procedure of an application on a computing device;
detect application permissions requested by the application from the computing device daring the install procedure;
determine a flag has been set on an application permission from among the detected application permissions based on an application security profile;
temporarily block the install procedure of the application from continuing on the computing device based on the flagged application permission;
identify, by a security module installed on the computing device where the application is temporarily blocked, a phone number of a remote user device stored within the application security profile; and
a network interface configured to transmit, via a network, a request to the remote user device based on the identified phone number, the request comprising an identification of the flagged application permission and a request for a user input via the remote user device to resume the temporarily install procedure;
receiving, by the security module installed on the computing device where the application is temporarily blocked, a response from the remote user device indicating whether or not to allow the application to access to the flagged application permission.

10. The apparatus of claim 9, wherein the processor is further configured to receive an application access operation on the computing device which comprises receipt of an install request message.

11. The apparatus of claim 9, wherein the flagged application permission comprises one or more of permission for in-app purchases and permission to access a contacts list stored on the computing system.

12. The apparatus of claim 9, wherein the request comprises a prompt transmitted to a user interface of the remote user device which requests a user input from a guardian.

13. The apparatus of claim 9, wherein the flagged application permission comprises one or more of access to location information, access to contacts, access to an e-mail account, access to an instant message account, access to a social network profile, access to photographs, access to multi-media, and access to documents.

14. The apparatus of claim 9, wherein the processor is further configured to display a list of the detected application permissions requested during the install procedure via a user interface of the computing device.

15. The apparatus of claim 12, wherein the input from the guardian overrides the temporarily blocked install procedure on the computing device.

16. A non-transitory computer readable storage medium configured to store instructions that when executed causes a processor to perform:
initiating an install procedure of an application on a computing device;
detecting application permissions requested by the application from the computing device during the install procedure;
determining a flag has been set on an application permission from among the detected application permissions based on an application security profile;
temporarily blocking the install procedure of the application from continuing on the computing device based on the flagged application permission;
identifying, by a security module installed on the computing device where the application is temporarily blocked, a phone number of a remote user device stored within a security profile of the computing device; and
transmitting, via a network, a request to the remote user device based on the identified phone number, the request comprising an identification of the flagged application permission and a request for a user input via the remote user device to resume the temporarily blocked install procedure;
receiving, by the security module installed on the computing device where the application is temporarily blocked, a response from the remote user device indicating whether or not to allow the application to access to the flagged application permission.

17. The non-transitory computer readable storage medium of claim 16, comprising receiving an application access operation on the computing device which comprises receiving an install request message.

18. The non-transitory computer readable storage medium of claim 16, wherein the flagged application permission comprises one or more of permission for in-app purchases and permission to access a contacts list stored on the computing system.

19. The non-transitory computer readable storage medium of claim 16, wherein the transmitting the request comprises transmitting a prompt to a user interface of the remote user device which requests a user input from a guardian.

20. The non-transitory computer readable storage medium of claim 16, wherein the flagged application permission comprises one or more of access to location information, access to contacts, access to an e-mail account, access to an instant message account, access to a social network profile, access to photographs, access to multi-media, and access to documents.

21. The non-transitory computer readable storage medium of claim 19, wherein the input from the guardian overrides the temporarily blocked install procedure on the computing device.

* * * * *